United States Patent

Braun

[15] 3,652,394
[45] Mar. 28, 1972

[54] DEVICE FOR CONTROLLING THE REACTIVITY OF NUCLEAR REACTORS

[72] Inventor: Wolfgang Braun, Buckenhof, Germany

[73] Assignee: Siemens Aktiengesellschaft, Berlin, Germany

[22] Filed: May 7, 1970

[21] Appl. No.: 35,312

[30] Foreign Application Priority Data

May 23, 1969 Germany......................P 19 26 344.6

[52] U.S. Cl.............................................176/86 R, 176/86 L
[51] Int. Cl...........................................G21c 7/08, G21c 7/22
[58] Field of Search........................................176/86 R, 86 L

[56] References Cited

UNITED STATES PATENTS 3,414,476  12/1968  Galli de Paratesi et al...........176/86 L
3,519,535  7/1970  French et al..............................176/86

FOREIGN PATENTS OR APPLICATIONS 1,081,214  8/1967  Great Britain........................176/86 L Primary Examiner—Carl D. Quarforth
Assistant Examiner—Harvey E. Behrend
Attorney—Curt M. Avery, Arthur E. Wilfond, Herbert L. Lerner and Daniel J. Tick

[57] ABSTRACT

Device for controlling the reactivity of a nuclear reactor cooled by light water and including a reactor core formed of fuel elements, includes a tube system passing through the reactor core and traversible by a water-soluble neutron absorber of adjustable concentration, separated by the tube system from light water coolant in the reactor core, the tube system including a plurality of substantially vertically extending fingerlike tubes always fully inserted in the fuel elements; a spiderlike holder holding the fingerlike tubes together at the upper ends thereof and serving as distributor for the neutron absorber to the fingerlike tubes, and a holder rod extending from the spiderlike distributor and serving as a central supply line for the neutron absorber to the spiderlike distributor.

15 Claims, 6 Drawing Figures

DEVICE FOR CONTROLLING THE REACTIVITY OF NUCLEAR REACTORS

SPECIFICATION

My invention relates to device for controlling the reactivity of nuclear reactors.

It has been known heretofore to employ control rods with solid absorption material that are stepwise insertable into and withdrawable from a reactor core for regulating the reactivity of a light water-cooled nuclear reactor, use being mostly made of a chemical additive, for example boron, in the coolant water. It has furthermore been proposed to employ in addition, individual finger control rods which are either inserted fully into the reactor core or are withdrawn therefrom in order to avoid axial irregularities or non-uniformities in the power density distribution.

With such control devices, instabilities in the power density distribution during load changes, for example, in the course of a daily load cyclic operation, of relatively large nuclear power plants cannot always be avoided.

It is accordingly an object of my invention to provide device for controlling the reactivity of nuclear reactors which markedly controls such instabilities.

With the foregoing and other objects in view, I provide in accordance with my invention device for controlling the reactivity of a nuclear reactor cooled by light water and including a reactor core formed of fuel elements, comprising a tube system passing through the reactor core and traversable by a water-soluble neutron absorber of adjustable concentration, separated by the tube system from light water coolant in the reactor core, the tube system comprising a plurality of substantially vertically extending fingerlike tubes always fully inserted in the fuel elements; a spiderlike holder holding the fingerlike tubes together at the upper ends thereof and serving as distributor for the neutron absorber to the fingerlike tubes, and a holder rod extending from the spiderlike distributor and serving as a central supply line for the neutron absorber to the spiderlike distributor.

By employing groups of such fingerlike tubes, which serve as finger control rods, a continuous variation in reactivity is rendered possible, the axial disturbance of the power density distribution being less than for the heretofore known control devices. Moreover, an increase in the man power density of about 25 percent is possible.

In accordance with other features of the invention, the fingerlike tubes of a unit or bundle thereof, are passed into respective guide tubes of a fuel element and the bundle of fingerlike tubes serving as control rods are withdrawable as a unit during a fuel element exchange. The central supply line extends upwardly through an upper framework of the reactor core and through the control rod tube of the cover of the reactor pressure vessel and is releasably sealed with respect to the vessel cover. Outer systems for variably adjusting the concentration of the neutron absorber are connected to the upper end of the central supply line.

In accordance with further features of the invention, the throughput or flow rate of absorber solution through the respective bundle of fingerlike control tubes is such that heat produced by neutron absorption, neutron braking or slowdown and $\gamma$-absorption, is reliably removed thereby. The neutron absorber is, advantageously, an aqueous solution of boric acid with an enrichment of $B^{10}$ with respect to the natural boron content.

In accordance with yet another feature of the invention, and in order to reduce any danger of a possible leak in this tube system, means are provided for maintaining the absorber solution under superpressure relative to the pressure of the reactor coolant.

According to an added feature of my invention, the fingerlike tubes passing through the reactor core are formed of a corrosion-resistant and neutron-permeable zirconium alloy, and are provided in the interior thereof with axial supply tubes for the absorber solution.

According to additional features of the invention, units of the fingerlike tubes are held together in groups by the distributor spiders and respectively cover two to nine fuel elements of the reactor core, passing through the fuel elements, respectively, with at least one fingerlike tube. To permit simultaneous use of solid control rods and the fingerlike control tubes, part of the fuel elements is not covered by the units of fingerlike tubes and is provided instead, with conventional control rods containing solid absorber material for fully cutting off the reactivity or partial length control rods for affecting the axial power density.

In accordance with other features of my invention and in order to permit the insertion of conventional solid control rods, the spiderlike distributors for the fingerlike tube units are located between the upper ends of the fuel elements and an upper grid or core support plate of the core framework, the solid control rods or partial length control rods being insertable into the reactor core between the individual legs of the spiderlike distributor. The solid control rods being held together in groups at the upper ends thereof by actuating spiders guided in guide inserts, the actuating spiders being located above the spiderlike distributors of the fingerlike tubes for the absorber solution even when the solid control rods are in fully inserted condition in the reactor core.

In accordance with a concomitant feature of my invention, the fingerlike control tube units are connected together by connecting lines for the absorber solution in annular zones covering the cross section of the reactor core so that the radial power density distribution is able to be controlled by variable adjustment of the concentration of the absorber solution for the individual zones.

The fingerlike tube units of my invention, simultaneously offer the possibility of attaching probes or sondes for instrumentation of the reactor core. Consequently, in accordance with another feature of my invention, I provide a sonde in the form of a fingerlike tube which is disposed in an extension of the central supply line so that the supply for the core instrumentation passes through the upper connection of the central supply line for the absorber solution and is releasably connected thereat with suitable cables or tube lines for withdrawing the sonde through the central supply line for absorber solution.

Other features which are considered as characteristic for the invention are set forth in the appended claims.

Although the invention is illustrated and described herein as device for controlling the reactivity of nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figures 1, 2:
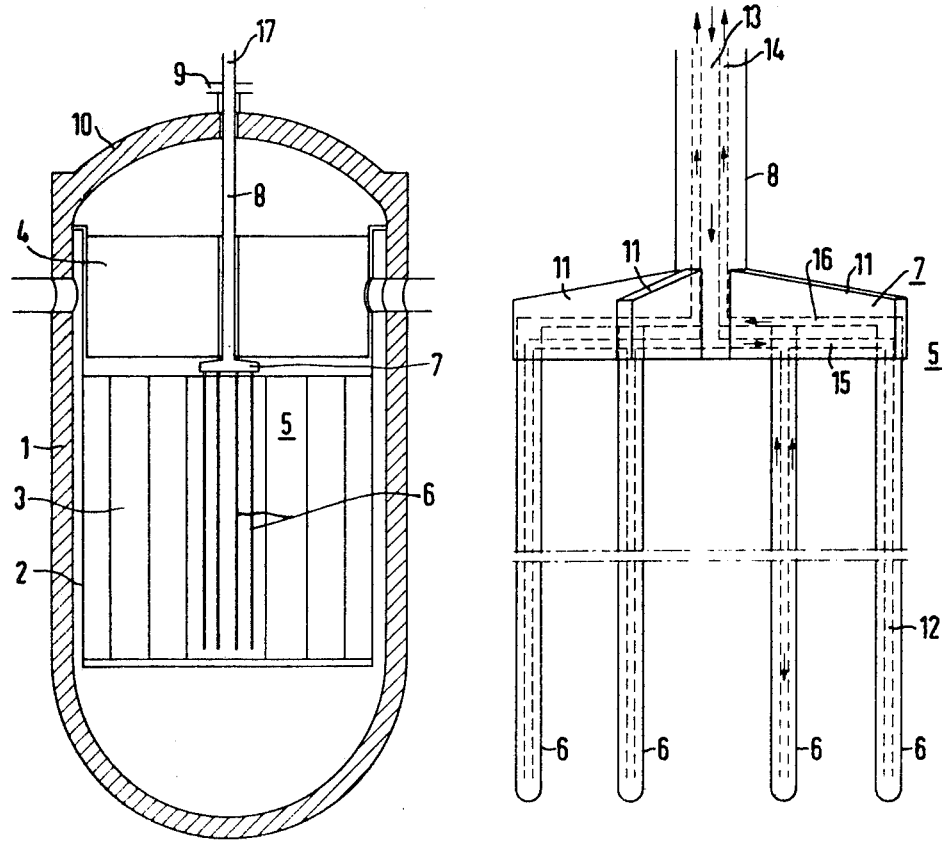
FIG. 1 is a longitudinal sectional view of a reactor pressure vessel showing the fingerlike control tubes, according to my invention, in fully inserted position.
FIG. 2 is a much enlarged schematic view of a unit assembly of the fingerlike tubes of FIG. 1.

Referring now to the drawings and first particularly to FIG. 1 thereof, there is shown a reactor pressure vessel 1 having a reactor core 2 within which fuel elements 3 are disposed. The fuel elements 3 are supported at the upper ends thereof by an upper core framework 4. Within a fuel element 3 extending along the axis of the pressure vessel 1 there is disposed a fingerlike control tube unit or bundle 5 which includes the individual fingerlike tubes 6. The fingerlike tubes 6 are suspended from a spider like distributor 7, and a supply tube 8 extends axially from the distributor 7 upwardly through the upper core framework 4 and passes through a cover seal 9 in the cover 10 of the reactor pressure vessel 1.

In the enlarged schematic view of the fingerlike control tube unit or bundle 5 shown in FIG. 2, the individual fingerlike tubes 6 are secured to the ends of the legs 11 of the spiderlike distributor 7. The individual fingerlike tubes 6 are formed of an outer jacket or encasing tube closed on the bottom thereof as well as an interior supply line 12 of smaller diameter, for supplying absorber liquid, located coaxial to the jacket. A supply tube 8 extends upwardly from the middle of the spiderlike distributor 7 and, in accordance with the embodiment illustrated in FIG. 2, two coaxial tubes 13 and 14 are located within the supply tube 8 and serve respectively for supplying and discharging absorber liquid. Within the spiderlike distributor 7, a line 15 branches off the inner supply tube 13 into each leg 11 of the spiderlike distributor 7, the lines 15 being connected respectively with the supply lines 12 that extend into the fingerlike tubes 6. The absorber liquid is thus conducted through the supply tube 13 and the connecting or branching line 15 through the individual coaxial supply lines 12 in the fingerlike tubes 6 until they reach the bottom of the jacket in the individual tubes 6, and then flows upwardly again and through radial connecting lines 16 disposed in the individual legs 11 of the spider like distributor 7 to the discharge tube 14 located within the common supply and holder tube 8.

The individual fingerlike control tube units 5 are supplied with absorber liquid through upper connections 17, shown diagrammatically in FIG. 1, located at the end of the supply tube 8. Control of the throughput or flow rate and of the concentration is thus rendered possible so that heat produced by neutron absorption, neutron braking or slowing down, or γ absorption can be reliably removed. The absorber solution is advantageously formed of an aqueous solution of boric acid wherein the boric acid is enriched with a quantity with a $B^{10}$ in an amount greater than the normal content of $B^{10}$ in boric acid.

In the event of damage to the individual fingerlike control tubes or rods 6, it is advantageous to subject the absorber solution to a higher operating pressure than that to which the reactor coolant is subjected so that the neutron absorbing solution will flow into the reactor coolant whenever a leak is formed within the reactor core. The possibility of such a disturbance causing reactivity to be freed, or runaway reactivity is thereby reduced.

Figure 3:
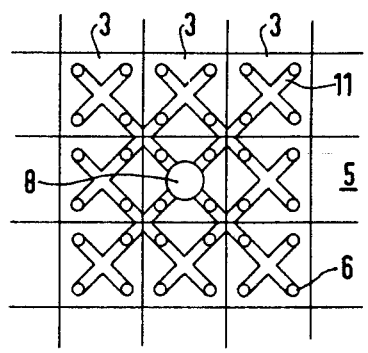
FIG. 3 is a plan view of a fingerlike tube unit assembly having for example nine groups each with four fingerlike tubes.

The bundle or unit 5 of fingerlike control tubes 6 are generally constructed so that several fuel elements 3, respectively, are covered by one bundle 5 of control tubes 6. In FIG. 3, there is shown an arrangement wherein nine fuel elements 3 are covered by a single bundle 5. Four fingerlike tubes 6 of the control tube bundle 5 extend into each of the fuel elements 3 of FIG. 3. The construction of the spiderlike distributor 7 for the case of the bundle 5 of FIG. 3 can be readily seen from this figure, the fingerlike control tube bundle having all told 36 individual fingerlike tubes 6. It is also possible however that, respectively, only one, two or four fuel elements 3 are covered by one control tube bundle 5.

Figure 4:
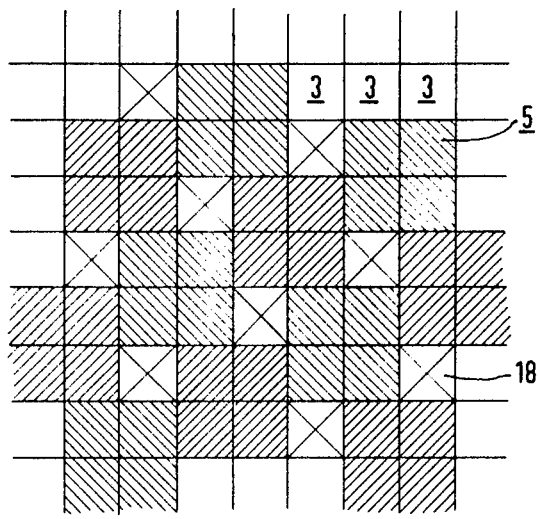
FIG. 4 is a diagrammatic view of the mosaic-like manner in which a fuel element is covered with fingerlike control tube groups or bundles.
Figure 5:
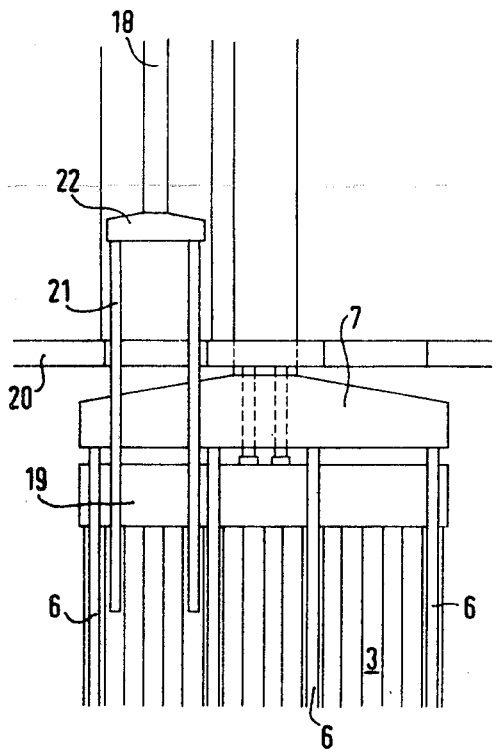
FIG. 5 is a partial enlarged diagrammatic elevational view of a fingerlike tube unit assembly shown in a fuel element in a reactor and also including auxiliary conventional solid control rods.

In order however to permit simultaneously the insertion of conventional solid rods, partial length control rods or shut-off or scram rods, the fingerlike control tube groups traversed by absorber liquid, as shown schematically in FIG. 4, are disposed in such a mosaic-like manner that when the reactor core is covered with groups of four liquid-filled control tube units 5, respectively, one fuel element between these units 5 is not covered so that a mechanically displaced solid conventional control rod or control rod finger 18 can be inserted therein. The coordination of mechanically displaced solid conventional control rods 18 with liquid-filled control tube units 5 according to the invention is disclosed in FIG. 5. A liquid-filled fingerlike control tube unit 5 with individual fingerlike tubes 6 is inserted initially into the fuel element 3 such a distance that the spiderlike distributor 7 is located between the upper ends of the fuel elements 3, i.e., above the fuel element heads 19, and below the upper grid plate 20 of the nuclear cor framework. In the intermediate space between the individual liquid-filled absorber tubes 6, a mechanically displaceable solid conventional control rod 18 with individual fingers 21 which are held together by a spider 22 is inserted into the fuel elements 3. The actuating spiders 22 of these mechanically displaceable control rods 18 are located, in the inserted condition of the control rods 18, above the spiderlike distributor 7 of the liquid-filled fingerlike control tube units 5, and the individual absorber fingers 21 of solid control rod 18 are located between the legs 11 of the spiderlike distributor 7 for the liquid-filled control tubes 6 so that the absorber fingers 21 of the solid control rods 18 are able to be inserted and removed from the fuel elements respectively located thereunder, without any hindrance.

It is advantageous that the spiderlike distributor 7 of the liquid-filled control tube units 5 are so constructed that they fulfill simultaneously the function of radially adjusting and axially holding down the fuel elements against the structures of the upper core framework.

In order to control the radial power density distribution in the reactor core 2, it is advantageous to combine the liquid-filled control tube groups 5 in annular zones over the cross section of the reactor core whereby separate adjustment of the concentration of the absorber liquid for each zone is possible. The liquid-filled control tube units 5 essentially serve to provide equalization or compensation for all rapid changes in reactivity in the reactor core 2 such as power changes and changes in fission product contamination. The axial power density distribution is controlled in a conventional manner by the partial length control tubes 18 whereas the scramming or rapid shut-off is effected by the conventional control rod fingers 21 having a solid absorber. The reactivity change produced by burn-off is compensated for in a conventional manner by conforming the concentration of a water-soluble neutron absorber in the entire reactor coolant.

Figure 6:
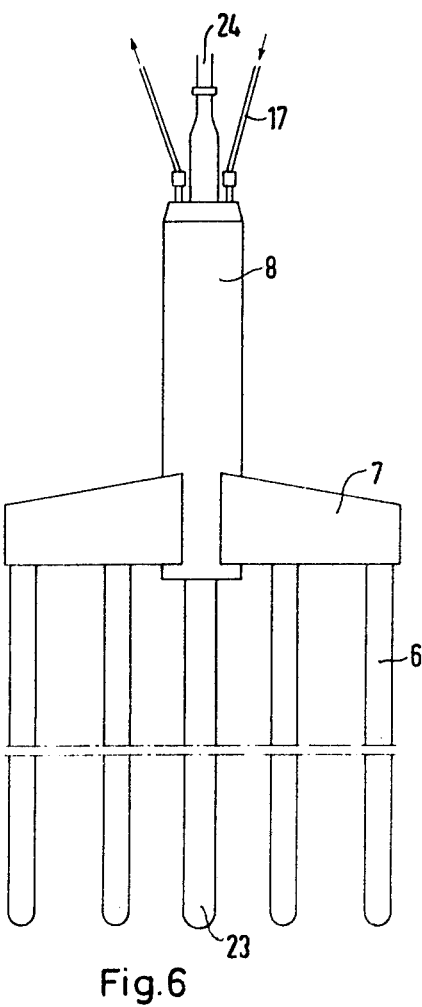
FIG. 6 is a schematic view of a fingerlike tube unit or bundle having an additional fingerlike tube for nuclear core instrumentation.

Such fingerlike control tubes 6 of my invention offer a good possibility for arranging an auxiliary probe or sonde for the core instrumentation as shown in FIG. 6. Thus, an additional fingerlike tube 23 is located in the axis of the fingerlike control tube unit 5, the tube 23 containing the core instrumentation. The instrumentation is built into the tube 23 in such a manner that the supply lines 24 pass through the supply tube 8 at the upper connection thereof and are releaseably connected thereat to the corresponding cables or tube lines. These probes or sondes 23 can then, if desired, also be withdrawn through the central supply tube 8.

In order to remove these liquid-filled control tube units, all of the connectors 17 and 24 at the upper end of the supply tube 8 are loosened or released, the cover of the reactor pressure vessel and the upper core framework located above the liquid-cooled fingerlike control units are removed so that the latter can be withdrawn from the respective fuel elements by means of a guide tool while the fuel element exchange can be carried on or held in free suspension and then reinstituted after the exchange of the respective fuel element.

The aforedescribed new device for chemically controlling the reactivity in light water-cooled nuclear reactors is particularly reliable in operation because it has no moving parts and no mechanisms within the reactor core. Moreover, less important and stable structures are possible thereby in the upper core framework. Due to the relatively easy control of the throughput or flow rate and the concentration of the absorber liquid, a continuous reactivity variation is possible which does not effect any axial disturbance of the power density distribution. Moreover, due to the aforedescribed and illustrated arrangement, the height of the installation at the upper core framework and at the reactor pressure vessel is minimized. The special advantage is particularly that the variations in reactivity connected with the daily cyclical operation is controllable while avoiding unduly great disturbance of the power density distribution, relief of the boric acid control system from rapid concentration changes being moreover possible thereby.

I claim:

1. Device for controlling the reactivity of a nuclear reactor cooled by light water and including a reactor core formed of fuel elements, comprising a tube system passing through the reactor core and traversible by a water-soluble neutron absorber of adjustable concentration separated by the tube system from light water coolant in the reactor core, said tube system including at least one control tube unit comprising a plurality of substantially vertically extending fingerlike tubes always fully inserted in the fuel elements during operation of the reactor; a spiderlike holder holding said fingerlike tubes together at the upper ends thereof and serving as distributor for the neutron absorber to said fingerlike tubes, and a holder rod extending from said spiderlike distributor and serving as a central supply line for the neutron absorber to said spiderlike distributor.

2. Device according to claim 1 wherein the fingerlike tubes of said control tube unit extend into a respective guide tube of a fuel element, and the fingerlike tubes of said control tube unit are removable together when the fuel element is exchanged.

3. Device according to claim 1 wherein the reactor core has an upper framework situated therewith in a pressure vessel closed by an upper cover, wherein said holder rod supply line extends centrally through said upper framework and through an opening formed in said pressure vessel cover, said opening being sealed between said holder rod supply line and said pressure vessel cover.

4. Device according to claim 3 including means for connecting to the upper end of said supply line outer systems for variably adjusting the concentration of the neutron absorber.

5. Device according to claim 1 including means for applying neutron absorber solution at predetermined flow rate to said tube system for reliably removing heat produced by neutron absorption, neutron braking and $\alpha$-absorption.

6. Device according to claim 1 wherein said neutron absorber is an aqueous solution of boric acid having an enrichment of $B^{10}$ with respect to the natural boron content.

7. Device according to claim 1, including means for subjecting the neutron absorber solution to a higher pressure than that of the reactor coolant water.

8. Device according to claim 1 wherein said fingerlike tubes are formed of a corrosion-resistant and neutron-permeable zirconium alloy and contain in the interior thereof axially extending supply tubes for the neutron absorber solution.

9. Device according to claim 1 wherein a plurality of said control tube units are held together in groups by respective distributor spiders, each of said groups covering two to nine fuel elements of the reactor core and passing through the respective fuel elements with at least one fingerlike tube.

10. Device according to claim 9 wherein said groups cover the reactor core so as to leave part of the fuel elements thereof exposed, and including control rods containing solid absorber material insertable into said exposed fuel elements.

11. Device according to claim 10 wherein said control rods are partial length control rods for controlling axial power density of the fuel elements.

12. Device according to claim 1 wherein said spiderlike distributors for said control tube units are located between the upper ends of the fuel elements and an upper grid plate of a framework for the nuclear core, and including control rods containing solid absorber material insertable into the reactor core between individual legs of said spiderlike distributors, said control rods being held together in groups at the upper ends thereof by respective actuating spiders guidable in guide inserts carried by the core framework, said actuating spiders being located above said spiderlike distributors of said fingerlike tubes even when said control rods are in fully inserted condition in the reactor core.

13. Device according to claim 1 wherein a plurality of said control tube units are connected together by connecting lines for the absorber solution in annular zones covering the cross section of the reactor core, the concentration of absorber solution of the control tube units in the respective zones being variably adjustable for controlling radial power density of the reactor core.

14. Device according to claim 1 wherein said control tube units are provided, respectively, with additional individual fingerlike tubes bypassed by said absorber supplying spiderlike distributor and adapted to receive therein sondes for core instrumentation.

15. Device according to claim 14 wherein an additional fingerlike tube is disposed in an extension of said central supply line so that supply lines for said core instrumentation extend through an upper connection of said central supply line, and said sondes are upwardly withdrawable through said central supply line.

* * * * *